US009578862B2

(12) United States Patent
 Taboada

(10) Patent No.: US 9,578,862 B2
(45) Date of Patent: Feb. 28, 2017

(54) DREDGE WITH REPLACEABLE ARMS

(71) Applicant: Keith Taboada, Brielle, NJ (US)

(72) Inventor: Keith Taboada, Brielle, NJ (US)

( * ) Notice: Subject to any disclaimer, the term of this patent is extended or adjusted under 35 U.S.C. 154(b) by 185 days.

(21) Appl. No.: 14/142,919

(22) Filed: Dec. 29, 2013

(65) Prior Publication Data

US 2015/0181846 A1 Jul. 2, 2015

(51) Int. Cl.
 *A01K 91/053* (2006.01)
 *A01K 91/08* (2006.01)
 *A01K 97/02* (2006.01)

(52) U.S. Cl.
 CPC ............ *A01K 91/053* (2013.01); *A01K 91/08* (2013.01); *A01K 97/02* (2013.01)

(58) Field of Classification Search
 CPC ....... A01K 91/053; A01K 91/06; A01K 91/08
 USPC ........ 43/6.5, 42.74, 27.4, 43.1, 43.15, 42.33
 IPC ............................... A01K 91/053,91/06, 91/08
 See application file for complete search history.

(56) References Cited

U.S. PATENT DOCUMENTS

| 1,352,979 | A | * | 9/1920 | Lawrence | ............ | A01K 91/053 |
| | | | | | | 43/42.74 |
| 2,289,663 | A | * | 7/1942 | Linhares | ................ | A01K 93/00 |
| | | | | | | 43/42.74 |
| 2,725,842 | A | * | 12/1955 | Norris | ................... | B63B 21/243 |
| | | | | | | 114/305 |
| 2,848,835 | A | * | 8/1958 | Witt | ........................ | A01K 95/00 |
| | | | | | | 43/42.74 |
| 4,870,777 | A | * | 10/1989 | Morita | .................. | A01K 91/053 |
| | | | | | | 43/42.74 |
| 6,493,985 | B2 | * | 12/2002 | Matches | ................ | A01K 69/10 |
| | | | | | | 43/105 |
| 7,412,795 | B2 | | 8/2008 | Glynn | | |
| 2005/0050790 | A1 | * | 3/2005 | Higgins | ............... | A01K 91/053 |
| | | | | | | 43/42.74 |
| 2011/0192071 | A1 | | 8/2011 | Adelman | | |

\* cited by examiner

*Primary Examiner* — Lisa Tsang

(57) ABSTRACT

A dredge having easily replaceable arms, a composite dredge which is configurable to laterally couple at least two hubs, and methods for using the same are provided. In one embodiment, a dredge includes plurality of arms having at least one teaser attachment and hub configured to removably retain the arms in a radial orientation. The hub includes a retainer cap configured to removably mate with a body in a manner that captures a first end of each of the plurality of arms to the hub in a cantilevered orientation. The arms are freely replaceable from the body upon the removal of the cap.

2 Claims, 5 Drawing Sheets

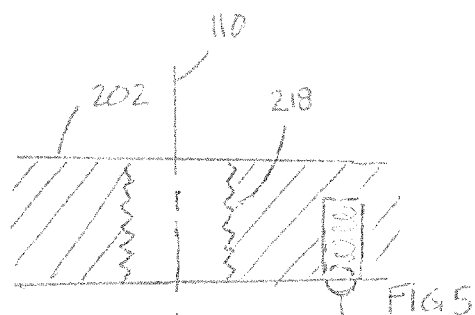
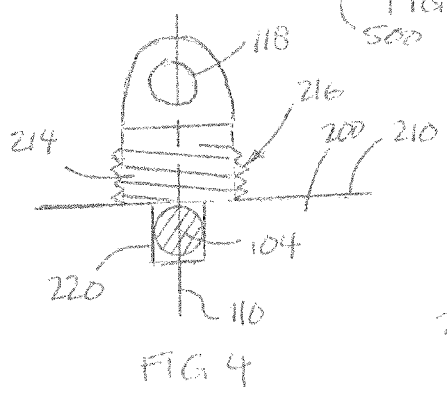
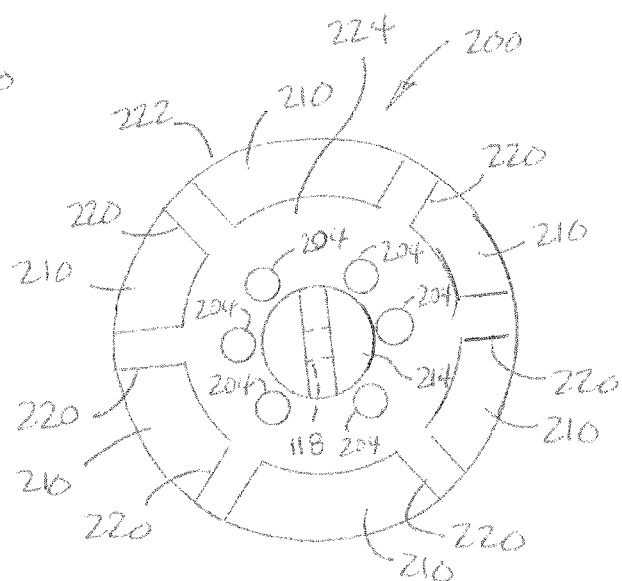

DREDGE WITH REPLACEABLE ARMS

BACKGROUND OF THE INVENTION

Field of the Invention

Embodiments of the invention generally relate to a dredge for simulating a bait ball.

Background

Dredges are teaser presentation devices utilized while trolling to simulate a bait ball. Teasers, such as artificial and natural hookless baits, are typically connected to arms extending from a central hub. Some dredges are as wide as 36 inches in diameter, as a greater number and spread of the presentation of the teasers more realistically imitates a bait ball. The arms are typically fixed to the hub, creating a storage problem when the dredge is not in use. Examples of available dredges can be found at most internet and catalog saltwater tackle supply, such as Tournament Cable and TackleDirect, both of which maintain internet sites.

A few dredges have collapsible or screw-in arms to improve the ability to store the dredge. However, the collapsible dredges and dredges having screw-in arms typically require tools to allow reconfiguration between the collapsed and open position. Additionally, dredge arms are prone to breakage, particularly when utilizing weighed natural baits, such as mullet. Replacing a single on most collapsible dredges require the dredge to be completely disassembled, which can be difficult on a rocking boat and can also lead to lost components.

Thus, there is a need for an improved dredge.

SUMMARY OF THE INVENTION

Embodiments of the invention include a dredge having easily replaceable arms, a composite dredge which is configurable to laterally couple at least two hubs, and methods for using the same.

In one embodiment, a dredge includes plurality of arms having at least one teaser attachment and hub configured to removably retain the arms in a radial orientation. The hub includes a retainer cap configured to removably mate with a body in a manner that captures a first end of each of the plurality of arms to the hub in a cantilevered orientation. The arms are freely replaceable from the body upon the removal of the cap.

In another embodiment, composite dredge is provided. The composite dredge includes a first hub connected laterally to a second hub. The first hub has a first plurality of arms configured to attach teasers thereto. The second hub has a second plurality of arms configured to attach teasers thereto.

In yet another embodiment, a method for using a dredge is provided that includes coupling a first plurality of arms to a first hub, the first plurality of arms configured to retain one or more teasers; coupling a second plurality of arms to a second hub, the second plurality of arms configured to retain one or more teasers; and laterally coupling the first hub to the second hub to form a composite dredge configured to be towed from a single line.

BRIEF DESCRIPTION OF THE DRAWINGS

The teachings of the present invention can be readily understood by considering the following detailed description in conjunction with the accompanying drawings, in which:

FIG. 3 is top view of a body of the hub;

FIG. 4 is a partial side view of the body of the hub with one arm of the dredge shown in cross section;

FIG. 5 is a sectional view of a portion of the retainer cap.

To facilitate understanding, identical reference numerals have been used, where possible, to designate identical elements that are common to the figures. It is contemplated that elements and features of one embodiment may be beneficially incorporated in other embodiments without further recitation.

It is to be noted, however, that the appended drawings illustrate only exemplary embodiments of this invention and are therefore not to be considered limiting of its scope, for the invention may admit to other equally effective embodiments.

DETAILED DESCRIPTION

Embodiments of the invention include a dredge having easily replaceable arms, a composite dredge which is configurable to laterally couple at least two hubs, and methods for using the same. In one or more embodiments, the arms are configured to be easily replaceable from a central hub, generally without the aid of tools. However, other embodiments may utilize tools for assembly/disassembly while enjoying other benefits of the invention. In one or more embodiments, all the arms extending from a central body of the hub are accessible for removal once a retainer cap is disengaged from the hub. In one or more embodiments, a connecting arm may be utilized to couple adjacent hubs. Embodiments also include methods for using the various embodiments.

Figure 1:
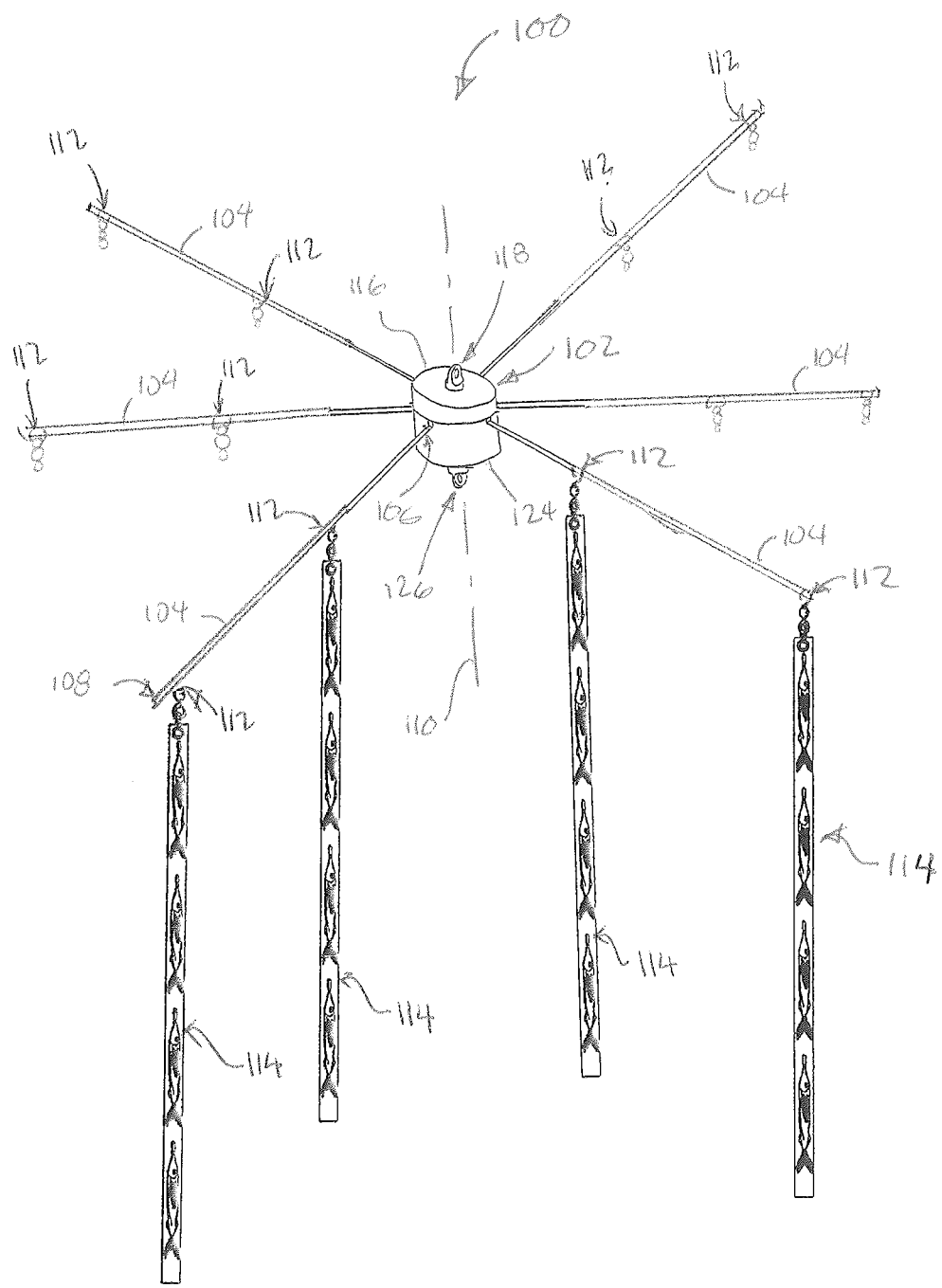
FIG. 1 is a perspective view of one embodiment of a dredge of the present invention illustrating a hub and a plurality of arms for spacing teasers.

FIG. 1 is a perspective view of a dredge 100 in accordance with one embodiment of the present invention. The dredge 100 includes a hub 102 having a plurality of arms 104 extending therefrom. A first end 106 of each arm 104 is coupled to the hub 102 so that the arm 104 extends radially outward from the hub 102 in a cantilevered orientation to a second end 108. The arms 104 may be arranged equidistantly around a central axis 110 of the hub 102. Although six arms 104 are shown extending from a single hub 102, it is contemplated that the hub 102 may be configured to accept more or less arms 104.

The arms 104 may extend in perpendicularly from the central axis 110 of the hub 102 so that all the arms 104 lie in a common plane. Alternatively, the arms 104 may extend in at an acute angle from the central axis 110 of the hub 102 so that all the arms 104 are oriented in a cone-shape about the hub 102. The arms 104 may be any suitable length, for example, 18", 24", 36", or other length.

The arms 104 may have a circular or other profile. The arms 104 are generally made of a resilient corrosion resistant material, such as stainless steel or titanium. In one embodiment, the arms 104 are fabricated from ⅛ inch titanium rod.

Each arm 104 include one or more teaser attachments 112. In the embodiment depicted in FIG. 1, the teaser attachments 112 are disposed at about the middle of the arm 104 and at the second end 108 of the arm 104. The teaser attachment 112 may be any suitable connection for coupling one or more teasers 114 to the arm 104. Conventional teaser attachments 112 include a loop formed in the rod comprising the arm 104 or a barrel swivel captured on a sleeve swaged to the arm 104. The teasers 114 may be natural baits, holographic strips, stick or artificial lures, and are often hookless. Teasers 114 are shown only attached to two of the arms 104 in FIG. 1.

A front end 116 of the hub 102 includes a towing eye 118. The towing eye 118 is disposed on the central axis 110 of the hub 102 and is configured to accept a snap swivel tied to a distal end of a towing line (not shown in FIG. 1). The towing line 122 may be cleated to the vessel (also not shown in FIG. 1), run from a reel disposed on the vessel, or other suitable attachment to allow the dredge 100 to be towed behind the vessel while trolling for fish such as marlin and tuna.

A rear end 124 of the hub 102 includes a rear eye 126. The rear eye 126 is disposed on the central axis 110 of the hub 102 and is utilized to attach additional teasers 114 to the hub 102 or to attach a second dredge behind the hub 102 to increase the number of teasers 114 towed behind the vessel. If additional dredges are attached to the hub 102 in-line with the central axis 110 of the hub 102, the overall length of the simulated bait ball formed by the daisy-chained dredges is increased. The lateral profile of the dredge 100 is defined as the perpendicular distance from the central axis 110 of the hub 102, i.e., lateral being perpendicular to length.

Figure 2:
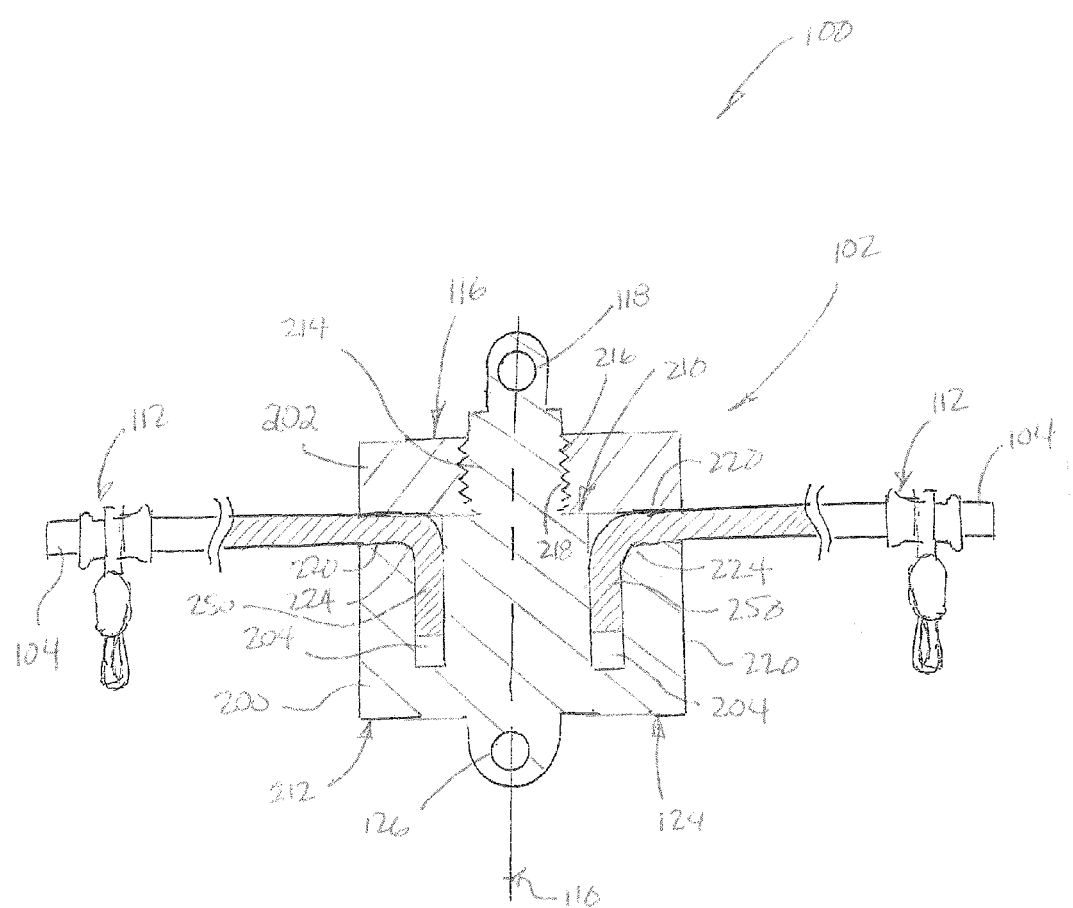
FIG. 2 is a side sectional view of the dredge of FIG. 1 illustrating a body and retainer cap of the hub.

FIG. 2 is a side sectional view of the dredge 100 depicted in FIG. 1 illustrating the hub 102 in greater detail. The hub 102 includes a body 200 and retainer cap 202. The retainer cap 202 is configured to removably mate with the body 200 in a manner that captures the first end 106 of the plurality of arms 104 to the hub 102 in a cantilevered orientation. The first end 106 of each arm 104 includes a retention feature 250 that extends out of the profile of the main elongated portion of the arm 104. For example, the retention feature 250 may be a linear portion of the arm 104 bent the main elongated portion of the arm 104, for example bent at an angle greater than or equal to about 90 degrees.

Once captured, the arms 104 are in an orientation and sufficiently secured to the hub 102 to allow operation of the dredge 100. i.e., towing of the teasers 114. Upon removal of the retainer cap 202 from the body 200, the arms 104 are all exposed in a position that allows the arms 104 to be freely removed from the body 200. As utilized for the purposes of the invention, "freely removed" is intended to mean that the arms 104 may be removed from the hub 102 without aid of tools or unthreading the arm from the hub.

In one embodiment, the body 200 is fabricated from a strong corrosion resistant material, such as stainless steel or other suitable material. The body 200 has a first end 210 and a second end 212 corresponding to the front 116 and rear end 124 of the hub 102. A boss 214 extends from the first end 210 of the body 200 and terminates in the towing eye 118. The boss 214 is configured to engage with the retainer cap 202 in a manner that secures the cap 202 to the body 200. For example, the boss 214 may include a groove for a retaining ring, a hole for a clevis pin, or other feature that secures the cap 202 to the body 200. In the embodiment depicted in FIG. 2, the boss 214 includes a male treaded portion 216 that engages a female treaded portion 218 of the cap 202.

The body 200 includes a plurality of arm receiving features formed through the first end 210 of the body 200 which are configured to mate with or engage the retention feature 250 of the arm 104 in a manner that retains the arm 104 to the hub 102. In the embodiment depicted in FIG. 2, the arm receiving features are in the form of a plurality of arm receiving holes 204. The arm receiving holes 204 may be blind holes or extend through the second end 212 of the body 200. The arm receiving holes 204 may be equally spaced in a polar array about the central axis 110 of the hub 102. The centerline of the holes 204 may be parallel to the central axis 110. Alternatively, the centerline of the holes 204 may be disposed at an angle other than perpendicular relative to the central axis 110. The holes 204 have diameter selected to allow a clearance fit with the first end 106 of the arms 104, thereby allowing each arm 104 to mate with a respective hole 204. Thus, when the retainer cap 202 is removed to exposed all the holes 204 from the first end 210 of the body 200, the arms 104 may be inserted to the holes 204 to assemble the dredge 100. Likewise, when the retainer cap 202 is removed all the arms 104 are exposed so that any damaged arm 104 may be quickly replaced if necessary, or the arms 104 removed from the holes 204 without tools to allow the dredge 100 to be quickly disassembled for storage. Beneficially, the engagement of the arms 104 in the holes 204 prevent all the arms 104 from falling out of the hub 102 once the cap 202 is removed, making it easier to replace a single arm 104 while the other arms 104 remain in place in the hub 102.

Referring additionally to FIGS. 3 and 4, a plurality of slots 220 are formed in the first end 210 of the body 200. The slots 220 extend from each hole 204 to an outer sidewall 222 of the body 200, for example, in a radial orientation. The slots 220 provide a channel for orientating the arms 104 radially from the central axis 110 of the hub 102. In one embodiment, the plurality of slots 220 may be in a common plane, for example a plane extending perpendicularly through the central axis 110. In another embodiment, the plurality of slots 220 may be in a common surface rotated about the central axis 110, for example, the surface of a cone. The plurality of slots 220 may be arranged equidistantly around the central axis 110 of the hub 102, for example in a polar array. The number of slots 220 are generally selected to space a desired number of arms 104.

A curved support surface 224 is formed in the body 200 and provides a transition between the slots 220 and the holes 204. The curved support surface 224 may be configured to have a radius that matches a radius of the bend forming the retention feature 250 of the arm 104. In one embodiment, the curved support surface 224 has a radius which is greater than about two times a diameter of the arm 104, and extends for about 90 degrees. The curved support surface 224 provides support for the arm 104 when loaded under use to reduce potential breakage at the transition between the slots 220 and the holes 204.

FIG. 5 is a sectional view of a portion of the retainer cap 202. The retainer cap 202 includes an anti-rotation mechanism 500 extending from a surface 502 of the cap 202 that faces the first end 210 of the body 200. The anti-rotation mechanism 500 may be a spring or detent ball. The anti-rotation mechanism 500 engages the slots 220 or other feature formed in the first end 210 of the body 200 to prevent the cap 202 from inadvertently unscrewing.

Figure 6:
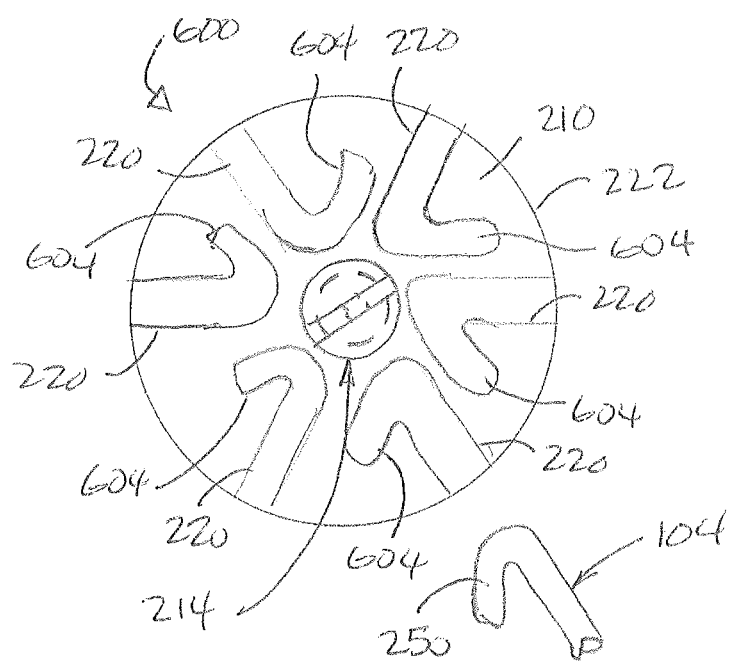
FIG. 6 is a top view of another body that may be utilized with the retainer cap to form the dredge of FIG. 1.

FIG. 6 is a top view of another body 600 that may be utilized with the retainer cap 202 to form the dredge 100. The body 600 is similar to the body 200 in all respects except that the plurality of arm receiving features formed through the first end 210 of the body 600 are in the form of a plurality of offset slots 604. Each offset slot 604 is generally connected to, but not linearly aligned with a respective one the slots 220. Thus, a non-linear channel is formed by each pair of slots 220, 604 which receive the retention feature 250 of the arm 104. Once the cap 202 is retained to the body 600, the retention feature 250 of the arm 104 is captured in the non-linear channel formed by the slots 220, 604.

Figure 7:
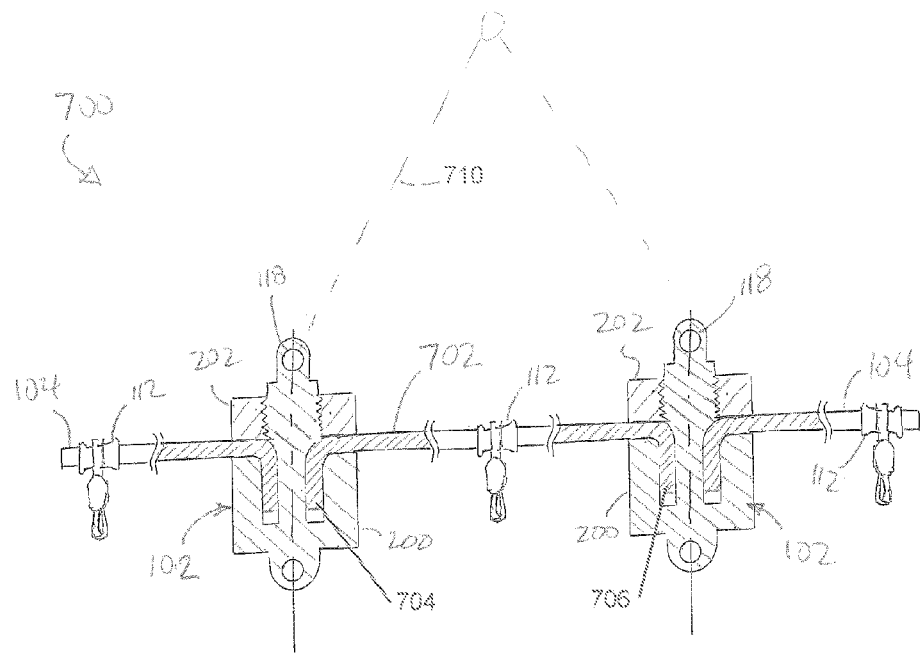
FIG. 7 is a partial sectional view of a composite dredge having at least two interconnected hubs.

FIG. 7 is a partial sectional view of a composite dredge 700 having at least two interconnected hubs 102. The composite dredge 700 may be towed using a bridle 710 (shown in phantom) attached to at least two of the hubs 102 comprising the dredge 700. The hubs 102 comprising the dredge 700 are identical of the hubs described above, having a plurality of arms 104 for connecting teasers 114, except wherein a least one connection arm 702 is utilized to secure at least one hub 102 to at least one other hub 102 of the of the composite dredge 700.

The connection arm 702 includes a retention feature 250 at opposite ends 704, 706 of the arm 702. The connection arm 702 may optionally have one or more teaser attachments 112 coupled to the arm 702 between the ends 704, 706. As discussed above, the retention feature 250 is configured to secure the arm 104 to a first hub 102 at the first end 704 and a second hub 102 at the second end 706 of the arm 702. In this manner, the diameter of the composite dredge 700 may be much greater than conventional dredges, thereby simulating a larger bait ball and attracting gamefish from a longer distance.

Figures 8A, 8B:
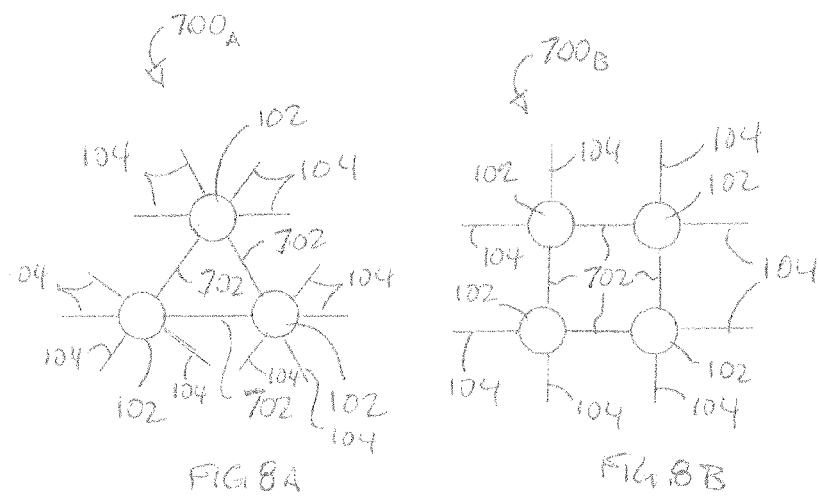
FIGS. 8A-B are schematic illustrations of different configurations for the composite dredge of FIG. 7.

Although only two hubs 102 are shown connected by a single arm 702 is shown in FIG. 7, it is contemplated that greater number of hubs 102 may be laterally connected utilizing additional arms 702. For example, FIG. 8A illustrates three hubs 102 coupled by two connection arms 702, while FIG. 8B illustrates four hubs 102 coupled by four connection arms 702.

It is also contemplated that the composite dredge 700 may be assembled by connecting hubs in other manners. For example, the connection arm 702 may be threaded or have another type of connector at opposite ends which allow the arm 702 to connect two hubs together.

The composite dredge may be utilized by coupling a first plurality of arms to a first hub, the first plurality of arms configured to retain one or more teasers; coupling a second plurality of arms to a second hub, the second plurality of arms configured to retain one or more teasers; and laterally coupling the first hub to the second hub to form a composite dredge configured to be towed from a single line. The assembled composite dredge may be towed behind a vessel to simulate a bait ball.

Thus, embodiments of dredges having arms that are easily removed from a central hub have been provided. The easy and rapid removal of the arms allows for one or more arms to be rapidly replaced or the dredge collapsed for rapid storages. Other embodiments allow for a plurality of hubs to be interconnected, thereby forming a composite dredge having a larger profile. Since the composite dredge has multiple hubs, the arms are much shorter than the radius of the assembled dredge, thereby allowing a larger diameter dredge to be readily collapsed and stowed in a smaller space.

Although various embodiments which incorporate the teachings of the present invention have been shown and described in detail herein, those skilled in the art can readily devise many other varied embodiment that still incorporate these teachings.

What is claimed is:

1. A composite dredge comprising:
a first plurality of arms, at least one arm of the first plurality of arms having at least one teaser attachment;
a second plurality of arms, at least one arm of the second plurality of arms having at least one teaser attachment;
a first hub having a front end and a rear end through which is defined a first central axis, the first hub configured to be towed in a direction aligned with the first central axis, the first plurality of arms extending outward from the first hub in a plane perpendicular to the first central axis; and
a second hub having a front end and a rear end through which is defined a second central axis which is substantially parallel with and laterally offset from the first central axis, the second plurality of arms extending outward from the second hub relative to the second central axis, wherein the second hub is laterally connected by a first arm of the first plurality of arms to the first hub in the plane perpendicular to the first central axis.

2. The dredge of claim 1 further comprising:
a third plurality of arms, at least one arm of the third plurality of arms having at least one teaser attachment; and
a third hub having a front end and a rear end through which is defined a third central axis which is substantially parallel with and laterally offset from the first central axis and the second central axis, the third plurality of arms extending outward from the third hub relative to the third central axis, wherein the third hub is laterally connected by a second arm to the first hub.

* * * * *